(12) United States Patent
Nanba et al.

(10) Patent No.: US 8,194,327 B2
(45) Date of Patent: Jun. 5, 2012

(54) OPTICAL COMPONENT AND METHOD FOR PRODUCING THE SAME

(75) Inventors: Toru Nanba, Osaka (JP); Tetsuya Suzuki, Osaka (JP); Toshiaki Takano, Osaka (JP); Tomokazu Tokunaga, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/840,774

(22) Filed: Jul. 21, 2010

(65) Prior Publication Data

US 2011/0019287 A1    Jan. 27, 2011

(30) Foreign Application Priority Data

Jul. 24, 2009   (JP) ................................. 2009-173477

(51) Int. Cl.
*G02B 3/00* (2006.01)
*C03B 21/00* (2006.01)

(52) U.S. Cl. ........... 359/642; 359/652; 359/900; 65/102

(58) Field of Classification Search .................. 359/642, 359/652, 900; 65/102, 63, 64
See application file for complete search history.

(56) References Cited

U.S. PATENT DOCUMENTS

| | | |
|---|---|---|
| 2005/0053788 A1 | 3/2005 | Terashima et al. |
| 2007/0096067 A1 | 5/2007 | Zou et al. |
| 2007/0225148 A1 | 9/2007 | Hayashi et al. |
| 2008/0207429 A1 | 8/2008 | Izuki |
| 2008/0231972 A1 | 9/2008 | Hachitani et al. |
| 2008/0287280 A1 | 11/2008 | Onoda et al. |
| 2011/0019286 A1 | 1/2011 | Nanba et al. |

FOREIGN PATENT DOCUMENTS

| | | |
|---|---|---|
| JP | 62-207728 | 9/1987 |
| JP | 8-217468 | 8/1996 |

*Primary Examiner* — Jack Dinh

(74) *Attorney, Agent, or Firm* — Hamre, Schumann, Mueller & Larson, P.C.

(57) ABSTRACT

This is to shed light on a glass composition suitable for a thin lens, and provide a lens (an optical component) manufactured with using the glass. A concave lens as an optical component is made of glass containing 12 to 16% of $B_2O_3$, 35 to 44% of $La_2O_3$, and 3 to 8% of ZnO, expressed as wt %. The concave lens has a thickness $t_1$ in its center portion of 0.5 mm or less, and a ratio $(W/t_1)$ of an external diameter W with respect to the thickness $t_1$ of 24 or more. The concave lens can be produced suitably by press forming.

4 Claims, 3 Drawing Sheets

OPTICAL COMPONENT AND METHOD FOR PRODUCING THE SAME

BACKGROUND OF THE INVENTION

1. Field of the Invention

The present invention relates to an optical component and a method for producing the optical component.

2. Description of Related Art

Glass lenses to be used for DSC (digital still cameras) or DVC (digital video cameras) are produced by press forming. Glass lenses having an aspherical shape can be produced at low cost by press forming.

In order to produce lenses with high shape accuracy, it is important to prevent glass from fusion bonding to a forming die, and the forming die is required to have very high surface accuracy and surface finish, in press forming. The following techniques are proposed for improving the glass (formed lens) separation from a forming die. Patent reference 1 discloses a technique in which the surface of a glass substrate is provided with a surface layer having a lower concentration of easily volatile components than the glass main body so that high surface accuracy and surface finish of a forming die can be ensured. Patent reference 2 discloses a technique for preventing glass from fusion bonding to a forming die by forming a carbon film on the surface of a glass preform.

It should be noted that the term "fusion bonding" in this description means a phenomenon that a part of glass adheres to a forming die so as to remain as a residue on the surface of the forming die, or that the formed product (lens) of glass sticks to the forming die. In forming a thin lens, either phenomenon can occur.

Patent reference 1-Japanese Patent Application Publication No. S62 (1987)-207728A Patent reference 2-Japanese Patent Application Publication No. H08 (1996)-217468A In recent years, the demand for reduction in size of image pickup optical systems represented by DSC and DVC has been increasing more and more. In order to reduce the size of image pickup optical systems, it is necessary to reduce the lens thickness. Specifically, it is necessary to establish a technique for mass producing very thin lenses such as concave lenses having a thickness of 0.5 mm or less in its center portion and a convex lens having a thickness of 0.5 mm or less in its outer peripheral portion (edge portion).

However, it is very difficult to produce such a thin lens by conventional press forming. In forming a lens, load is concentrated on the thin portion of the lens, thus fusion bonding of glass to a forming die becomes notable. The fusion bonding of glass to the forming die not only deteriorates the shape accuracy of a lens as a finished product, but also impairs the surface accuracy of the forming die because of the residual glass adhering to the forming die, which makes it difficult to use the same forming die continuously. Although the techniques disclosed in Patent references 1 and 2 have some effect in preventing the glass from fusion bonding to the forming die, the effect is still insufficient. Further, the techniques of Patent references 1 and 2 suffer from problems such as an increase in the number of steps, and an increase in cost, because various pretreatments are required therein.

SUMMARY OF THE INVENTION

It is an objective of the present invention to shed light on a glass composition suitable for a thin lens, and to provide a lens (optical component) produced using the glass.

That is, the present invention provides an optical component made of glass containing 12 to 16% of $B_2O_3$, 35 to 44% of $La_2O_3$, and 3 to 8% of ZnO, expressed as wt %. The optical component is formed as a concave lens that has a thickness $t_1$ in its center portion of 0.5 mm or less and a ratio ($W/t_1$) of an external diameter W with respect to the thickness $t_1$ of 24 or more, or a convex lens that has a maximum thickness in its outer peripheral portion of 0.5 mm or less.

According to another aspect of the present invention, there is provided a method for producing an optical component including the steps of supplying a preformed body made of glass for manufacturing an optical component into a forming die; clamping the forming the transferring the surface shape of the forming die to the preformed body by heating and pressing the preformed body; and opening the forming die in order to remove the formed optical component therefrom. The glass for the optical component contains 12 to 16% of $B_2O_3$, 35 to 44% of $La_2O_3$, and 3 to 8% of ZnO, expressed as wt %, and the optical component is formed as a concave lens that has a thickness $t_1$ in its center portion of 0.5 mm or less and a ratio ($W/t_1$) of an external diameter W with respect to the thickness $t_1$ of the center portion of 24 or more, or a convex lens that has a maximum thickness in its outer peripheral portion of 0.5 mm or less.

The inventors have found that there is a correlation between the likelihood of the occurrence of glass fusion bonding to a forming die and the composition of the glass. That is, use of the glass containing components within the ranges as mentioned above can prevent the glass from fusion bonding to a forming die, so that stable production of thin lenses by press forming is rendered possible. The present invention eliminates the need for particular pretreatments also, and thus is free from the problems such as an increase in the number of steps and an increase in cost. The lens provided by the present invention enables a reduction in the size of image pickup optical systems such as DSC.

DETAILED DESCRIPTION OF THE INVENTION

Figure 1:
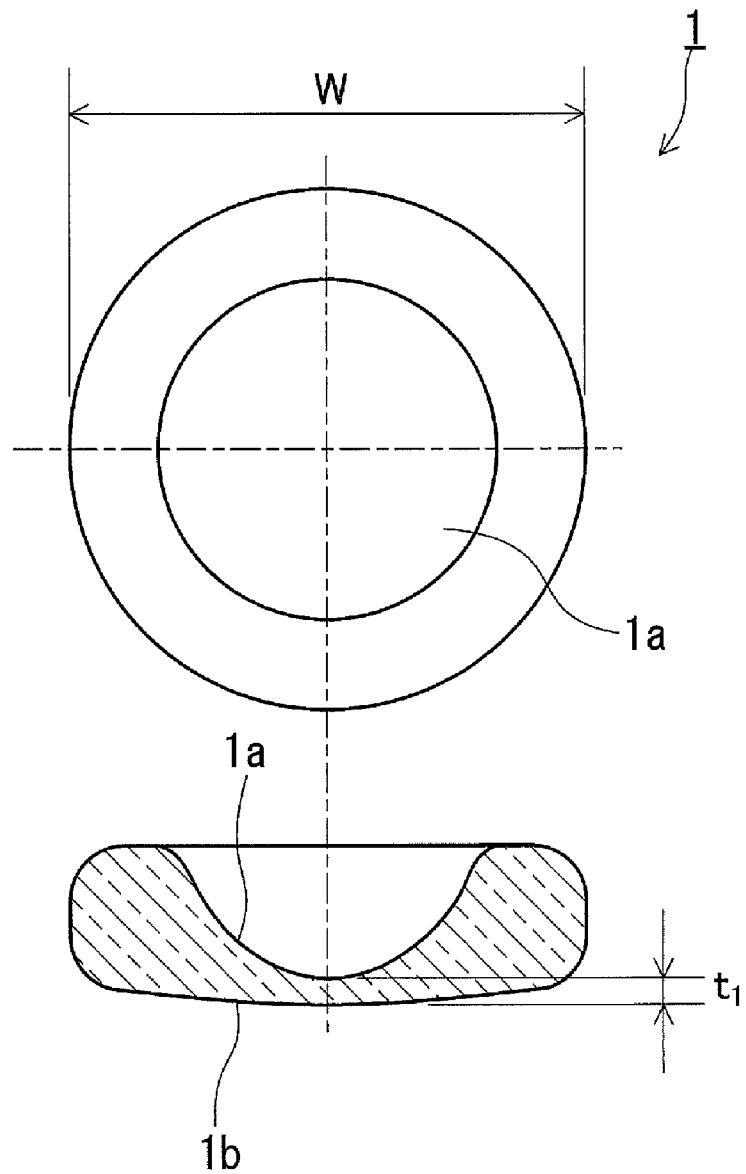
FIG. 1 shows a top view and a sectional view illustrating an optical component (concave lens) according to one embodiment of the present invention.

As indicated in FIG. 1, a lens 1 according to one embodiment of the present invention is formed as a concave lens having a concave surface 1a and a convex surface 1b. The lens 1 is a so-called aspherical lens and has a meniscus shape. The lens having a meniscus shape means a crescent shaped lens with one surface being convex and the other surface being concave. Types of meniscus lenses include a concave meniscus lens in which the outer peripheral portion has a thickness larger than the center portion, and a convex meniscus lens in which the center portion has a thickness larger than the outer peripheral portion. The lens 1 indicated in FIG. 1 is a concave meniscus lens.

The lens 1 is suitable for small optical devices, and has an external diameter W, for example, in the range of 10 to 20 mm. The center portion of the lens 1 has a thickness $t_1$, for example, in the range of 0.1 to 0.5 mm. The ratio ($W/t_1$) of the diameter W with respect to the thickness $t_1$ of the center portion is, for example, 24 or more. The upper limit of the ratio ($W/t_1$) is not limited particularly, but for example, is 200.

Figure 2:
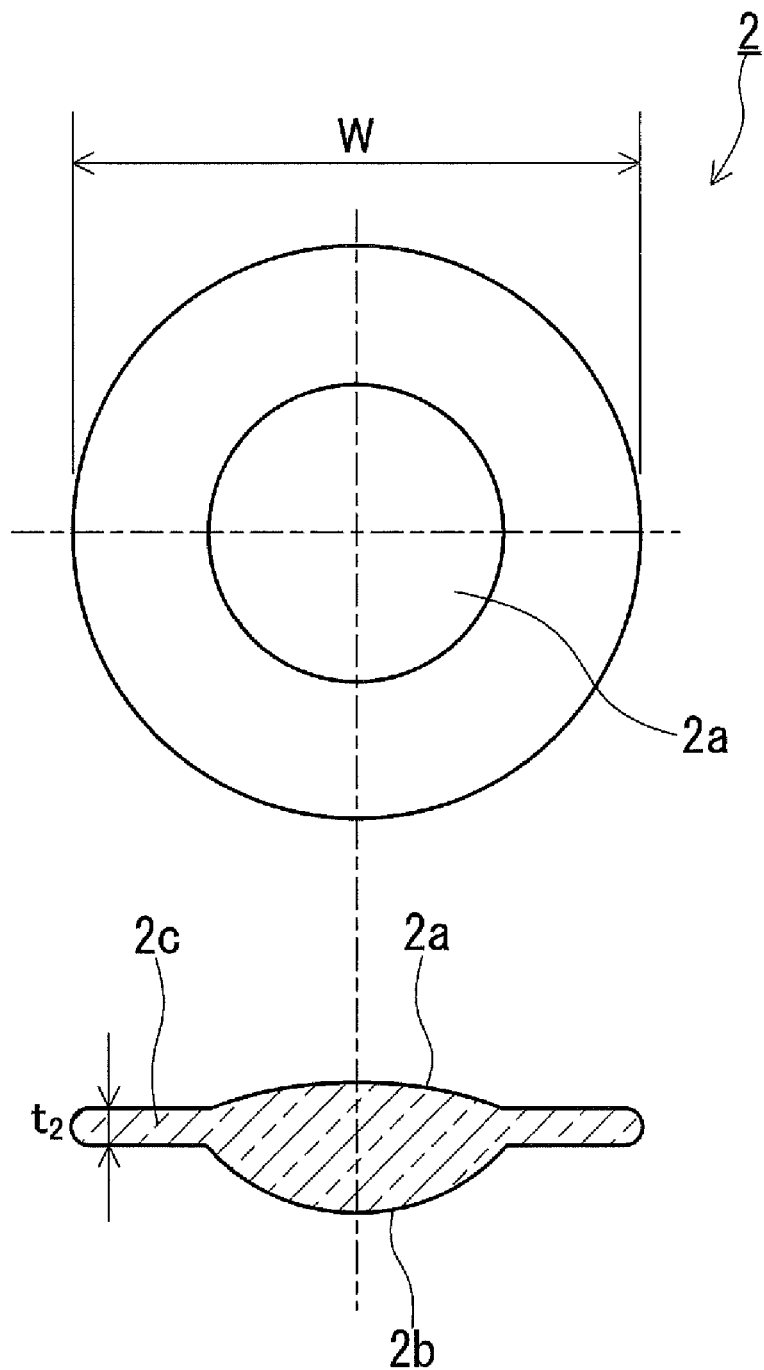
FIG. 2 shows a top view and a sectional view illustrating an optical component (convex lens) according to another embodiment of the present invention.

As indicated in FIG. 2, a lens 2 according to another embodiment of the present invention is formed as a biconvex lens having two convex surfaces 2a and 2b. The lens 2 also is a so-called aspherical lens. The lens 2 further has an outer peripheral portion 2c (edge portion) with a reduced thickness. The outer peripheral portion 2c is a portion that is used for fixing the lens 2 to a housing in an optical device, and that does not form an optical path. As is the lens 1, the lens 2 also is suitable for small optical devices, and has an external diameter W, for example, in the range of 10 to 20 mm. The outer peripheral portion 2c of the lens 2 has a maximum thickness $t_2$, for example, in the range of 0.1 to 0.5 mm.

Next, the method for producing the lens 1 is described. The production method according to this embodiment employs press forming (so-called precision glass forming) using a forming die. First, a preformed body to be used for producing the lens 1 is prepared. Specifically, the preformed body is obtained by grinding and/or polishing optical glass including a particular composition to process it into an analogous shape to the lens 1.

In the case of producing a thin lens by press forming, it is important to prevent glass from fusion bonding to the forming die. As seen from the working examples discussed below, there is a correlation between the likelihood of the occurrence of the glass fusion bonding to the forming die and the composition of the glass. That is, by using the glass containing 12 to 16% of $B_2O_3$, 35 to 44% of $La_2O_3$, and 3 to 8% of ZnO, expressed as wt %, it is possible to prevent the fusion bonding of the glass to the forming die effectively.

Further, the glass to be used for producing the lens 1 (or the lens 2) has a refractive index (nd) in the range of 1.84 to 1.88 and an Abbe number (vd) in the range of 39 to 43, for example. The glass having a high refractive index is advantageous in reducing the thickness of the lens. The glass having a high Abbe number enables clear images to be obtained.

A detailed example of the glass composition that satisfies the requirements mentioned above is described below. The values are expressed as wt %.
$SiO_2$: 5 to 8%, preferably 5 to 7%
$B_2O_3$: 12 to 16%, preferably 13 to 16%
$Li_2O$: 0 to 3%, preferably 0 to 2%
ZnO: 3 to 8%, preferably 5 to 8%
$ZrO_2$: 3 to 8%, preferably 5 to 8%
$Nb_2O_5$: 0 to 2%, preferably 1 to 2%
$La_2O_3$: 35 to 44%, preferably 38 to 44%
$Gd_2O_3$: 6 to 12%, preferably 6 to 10%
$Ta_2O_3$: 10 to 20%, preferably 15 to 20%
$WO_3$: 0 to 2%, preferably 1 to 2%

Next, as indicated in FIGS. 3A to 3D, a preformed body 10 is press formed. A forming device provided with an upper die 3, a lower die 4, a cylindrical die 5, an upper head 6 and a lower head 7 can be used for press forming. In the forming device, the upper head 6 is provided above the upper die 3, and the lower head 7 is provided so as to support the lower die 4. The upper head 6 is provided with heating and pressing mechanisms (not shown in the drawings). Similarly, the lower head 7 is provided with a heating mechanism.

The upper die 3 includes a convex portion 3a and a supporting portion 3b that surrounds the convex portion 3a. The convex portion 3a is a portion in contact with the concave surface of the preformed body 10, and the supporting portion 3b is a circular portion in contact with the outer peripheral portion of the preformed body 10. Each surface of the upper die 3 and the lower die 4 is processed to have a desired accuracy and shape so that the lens 1, which is shaped by the upper die 3, the lower die 4 and the cylindrical die 5, has optical properties as designed. Depending on the circumstances, the surface of the cylindrical die 5 also is processed to have a desired accuracy and shape.

The upper die 3, the lower die 4 and the cylindrical die 5 typically are made of cemented carbide such as WC. The cemented carbide is preferable as a material of forming dies because of its excellent strength. The upper die 3, the lower die 4 and the cylindrical die 5 each may be constituted by a base material made of metal such as stainless steel and a plating layer (for example, an electroless nickel plating layer) covering the surface of the base material. Furthermore, a releasing layer may be formed on each surface of the upper die 3, the lower die 4 and the cylindrical die 5 for improving the releasability and the corrosion resistance.

Figure 3A:
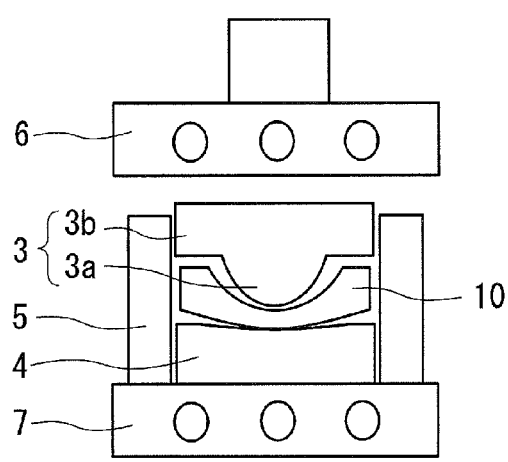
FIGS. 3A to 3D are views illustrating the steps of the method for producing a lens.

First, the preformed body 10 is supplied into a forming die that is constituted by the upper die 3, the lower die 4 and the cylindrical die 5 as indicated in FIG. 3A.

Figure 3C:
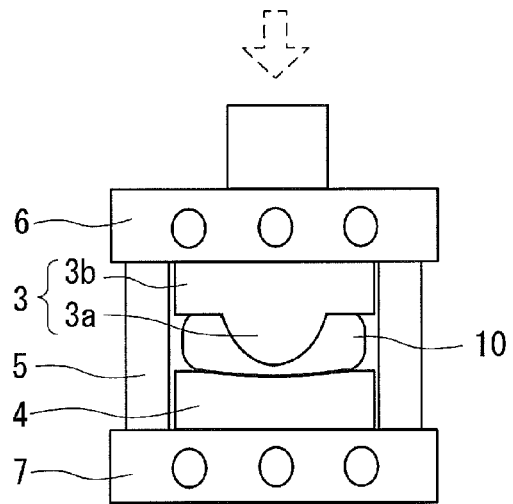
Figure 3B:
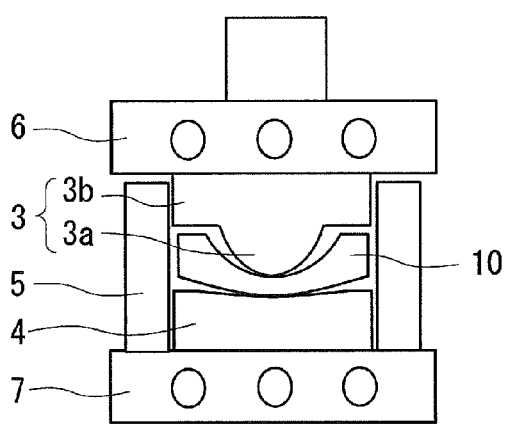

Next, the upper head 6 is lowered, so that the upper die 3, the lower die 4 and the cylindrical die 5 are clamped as indicated in FIG. 3B. Then, the heating mechanisms in the upper head 6 and the lower head 7 are activated in this state to heat the preformed body 10 to a predetermined temperature. The predetermined temperature is, for example, a slightly higher temperature than the glass transition temperature (Tg) or the deformation temperature (At) of the glass to be used (for example, a temperature higher than the Tg or At by 20 to 40° C.). Preferably, the heating is performed at an approximate temperature increase rate in which the preformed body 10 takes several minutes (for example, 5 minutes) to reach the predetermined temperature.

After the preformed body 10 has reached the predetermined temperature, the upper head 6 is lowered slowly and thereby pressure is applied on the upper die 3, as indicated in FIG. 3C. The pressure from the upper head 6 is applied on the preformed body 10 via the upper die 3, so that the preformed body 10 is deformed gradually. Thus, the shape of each surface of the upper die 3 and the lower die 4 is transferred to the preformed body 10. The pressure to be applied on the preformed body 10 is, for example, 50 to 300 kgf.

When the preformed body 10 is deformed into the shape of the lens 1, the upper head 6 stops applying the pressure. Then, this state is maintained at the above-mentioned predetermined temperature for about 1 minute. Thereafter, the heating mechanisms in the upper head 6 and the lower head 7 are turned off, and the lens 1 is cooled to the glass transition temperature while the upper head 6 is kept lowered. In order to avoid the occurrence of defects in the lens 1 such as distortion, it is preferable that the lens 1 be cooled slowly over several minutes (for example, about 5 minutes).

Figure 3D:
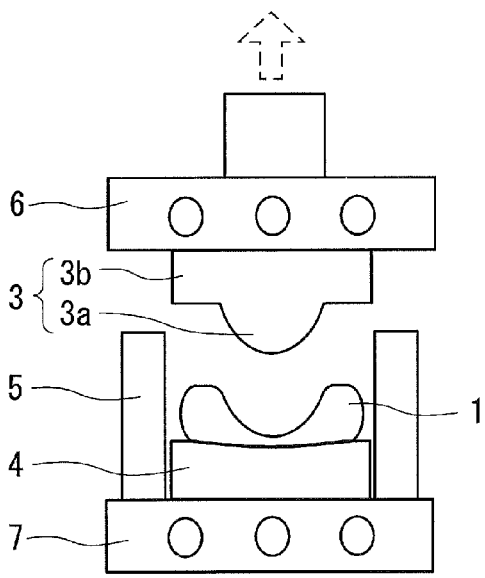

Finally, the upper head 6 and the upper die 3 are opened so that the formed lens 1 can be removed therefrom, as indicated in FIG. 3D. It should be noted that each step of FIGS. 3A to 3D can be performed under an inert atmosphere such as a nitrogen atmosphere or an argon atmosphere. Such shape forming under an inert atmosphere is preferable for extending the life span of a forming die because the oxidation of the forming die can be prevented.

The concave meniscus lens 1 described with reference to FIG. 1 generally has the concave surface 1a that is inclined more steeply than conventional spherical lenses, convex meniscus lenses, and the like. Therefore, the glass is likely to be fusion bonded to a forming die. Accordingly, as is this embodiment, it is particularly effective to employ glass having a composition that is unlikely to cause the occurrence of fusion bonding as a material of the concave meniscus lens. Of course, such glass is significant also for a biconvex lens that is a lens having two convex surfaces in combination (FIG. 2), a biconcave lens that is a lens having two concave surfaces in combination, and a planoconvex lens and planoconcave lens each being a lens with one flat surface.

EXAMPLES

Using glass having a composition and optical constants indicated in Table 1, concave meniscus lenses having a shape indicated in FIG. 1 were produced by press forming that has been described with reference to FIGS. 3A to 3D. Specifically, using each glass, 20 lenses for each of 4 kinds of concave meniscus lenses that have a thickness $t_1$ in the center portion, respectively, of 0.9 mm, 0.7 mm, 0.5 mm and 0.3 mm were produced continuously. The presence or absence of fusion bonding of the glass to the forming die was investigated. All the lenses were set to have an external diameter W of 14 mm, an approximate concave curvature of 4 mm, and an approximate convex curvature of 280 mm. The press forming process was performed under a nitrogen atmosphere. At the time of glass formation, the heating temperature was set to 600° C., and the pressure force was set to 150 kgf. Table 1 indicates the results.

TABLE 1

|  | GLASS No. 1 | GLASS No. 2 | GLASS No. 3 |
|---|---|---|---|
| nd | 1.85 | 1.86 | 1.85 |
| vd | 40 | 41 | 39 |
| $SiO_2$ | 6.0 | 5.6 | 7.4 |
| $B_2O_3$ | 14.0 | 11.4 | 11.6 |
| $Li_2O$ | 1.0 | 1.0 | 2.7 |
| ZnO | 5.4 | 5.3 | 2.9 |
| $ZrO_2$ | 6.1 | 5.8 | 2.2 |
| $TiO_2$ | — | — | 4.0 |
| $Nb_2O_5$ | 1.8 | 1.0 | 2.0 |
| $La_2O_3$ | 39.2 | 37.8 | 33.0 |
| $Gd_2O_3$ | 7.5 | 9.0 | 21.3 |
| $Ta_2O_5$ | 17.7 | 18.4 | 9.7 |
| $GeO_2$ | — | 4.6 | 3.3 |
| $WO_3$ | 1.3 | — | — |
| FORMATION EVALUATION | | | |
| 0.9 mm | ○ | ○ | ○ |
| 0.7 mm | ○ | ○ | x |
| 0.5 mm | ○ | x | x |
| 0.3 mm | ○ | x | x |

In Table 1, the formation was evaluated as "○" that means no fusion bonding occurred, "Δ" that means fusion bonding occurred in 1 to 3 lenses, and "x" that means fusion bonding occurred in 4 or more lenses, when 20 lenses were produced continuously.

In the case of using the glass No. 1, even if the thickness of the center portion was reduced to 0.5 mm or less, the glass was not fusion bonded to the forming die, and stable formation of concave meniscus lenses having a desired shape was possible. In contrast, in the case of using the glass No. 2, the glass was fusion bonded to the forming die in a significant percentage when the thickness of the center portion was 0.5 mm or less, and stable formation was not feasible. Similarly, in the case of using the glass No. 3, the glass was fusion bonded to the forming die in a significant percentage when the thickness of the center portion was 0.7 mm or less.

As a result of X-ray photoelectron spectral analysis (XPS) for the surface of each forming die after concave meniscus lenses were formed using the glass No. 1 to No. 3, peaks based on B, La and Zn were observed. That is, B, La and Zn contained in the glass were present on the surface of the forming die. The present amount of B, La and Zn was larger in the order of the glass No. 1, the glass No. 2, and the glass No. 3. In view of these, it is conceivable that when the glass contains appropriate amounts of B, La and Zn, these components cause a releasing effect by spreading or diffusing to the surface of the forming die, thereby rendering the fusion bonding of the glass to the forming die unlikely to occur.

From the above results, it can be said that use of glass that contains 12 to 16% of $B_2O_3$, 35 to 44% of $La_2O_3$, and 3 to 8% of ZnO, expressed as wt %, can prevent the glass from fusion bonding to a forming die. The preferable contents of $B_2O_3$, $La_2O_3$, and ZnO are respectively 13 to 16%, 38 to 44%, and 5 to 8%. It may seem that the greater the contained amounts of these components, the more the prevention effect of the fusion bonding is enhanced, but when they are contained in an excess amount, there are problems such as the difficulty of achieving a desired optical constant and the possibility of causing the devitrification of glass. Specifically, an excess content of $B_2O_3$ makes it difficult to adjust the refractive index to a desired range. An excess content of $La_2O_3$ causes glass devitrification to occur easily. An excess content of ZnO makes it difficult to adjust the refractive index and Abbe number to desired ranges. Accordingly, each component should be contained within the above-mentioned range. By using the glass with such a composition, concave lenses that have a thickness $t_1$ in its center portion of 0.5 mm or less and a ratio ($W/t_1$) of an external diameter W with respect to the thickness $t_1$ of the center portion of 24 or more can be produced by press forming at a high yield. By preventing the glass fusion bonding to a forming die, the surface accuracy of the forming die and the surface finish thereof also can be kept high. This can reduce the frequency of maintenance for a forming die, and as a result, it becomes possible to achieve high productivity.

It should be noted that tendencies similar to the case of the concave lens were observed in the case of forming the convex lens indicated in FIG. 2. That is, although the thinner the outer peripheral portion 2c was, the more the fusion bonding of glass to a forming die occurred easily, stable formation of convex lenses having a maximum thickness $t_2$ in its outer peripheral portion 2c of 0.5 mm or less was possible by using the glass No. 1.

The optical component (optical lens) of the present invention can be used suitably for optical devices such as DSC, DVC, cell phone cameras, projection televisions, optical pickups, and the like.

What is claimed is:

1. An optical component made of glass containing 12 to 16% of $B_2O_3$, 35 to 44% of $La_2O_3$, and 3 to 8% of ZnO, expressed as wt %,
the optical component being formed as a concave lens that has a thickness $t_1$ in its center portion of 0.5 mm or less and a ratio $W/t_1$ of a diameter W with respect to the thickness $t_1$ of 24 or more, or a convex lens that has a maximum thickness in its outer peripheral portion of 0.5 mm or less.

2. The optical component according to claim 1, wherein the glass has a refractive index nd in the range of 1.84 to 1.88, and an Abbe number vd in the range of 39 to 43.

3. The optical component according to claim 1, wherein the optical component is produced by press forming.

4. A method for producing an optical component comprising the steps of:
supplying a preformed body made of glass for an optical component into a forming die;
clamping the preformed body with the forming die;

transferring a surface shape of the forming die to the preformed body by heating and pressing the preformed body; and opening the forming die in order to remove the formed optical component therefrom, wherein the glass contains 12 to 16% of $B_2O_3$, 35 to 44% of $La_2O_3$, and 3 to 8% of ZnO, expressed as wt %, and the optical component is formed as a concave lens that has a thickness $t_1$ in its center portion of 0.5 mm or less and a ratio $W/t_1$ of a diameter W with respect to the thickness $t_1$ of 24 or more, or a convex lens that has a maximum thickness in its outer peripheral portion of 0.5 mm or less.

* * * * *